Jan. 2, 1923.
G. EASTMAN.
ROLL FILM CARTRIDGE.
FILED SEPT. 23, 1921.
1,441,146.
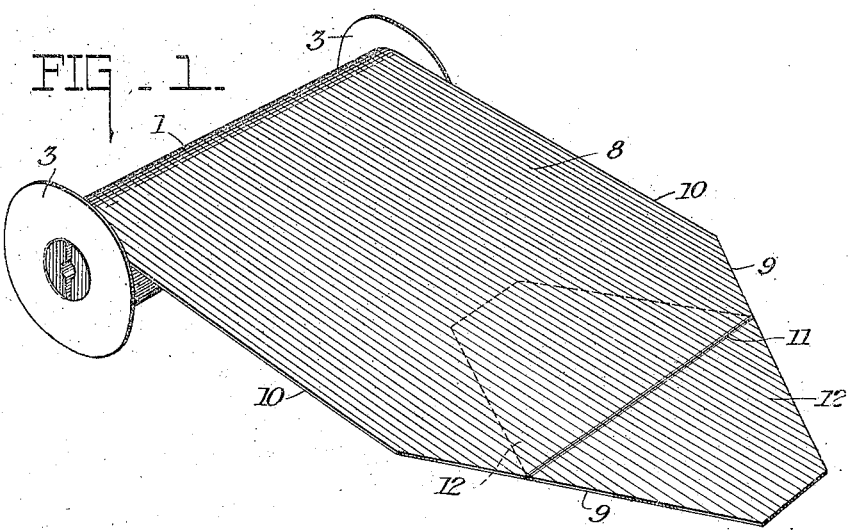
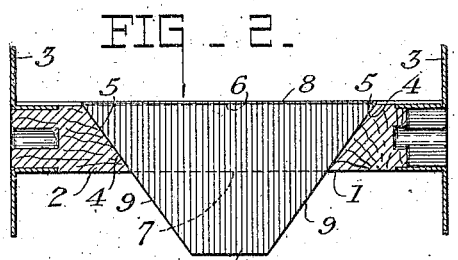
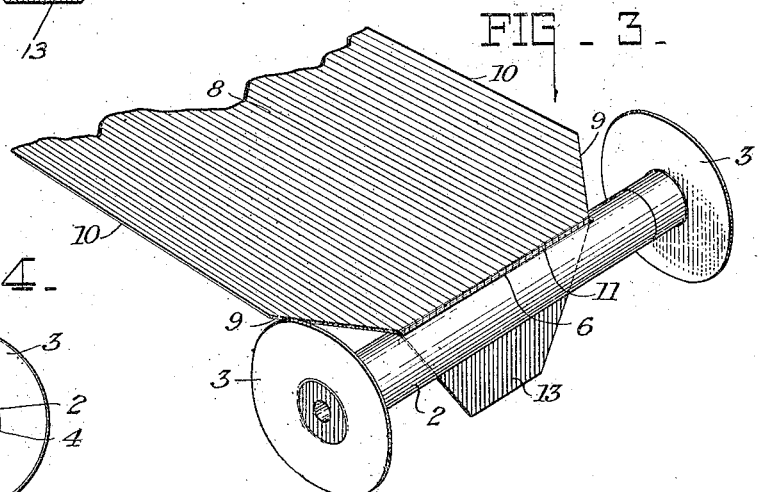
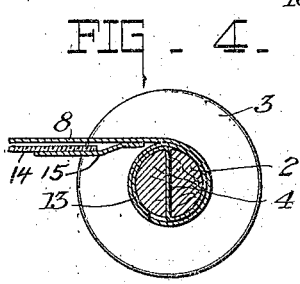
WITNESS
Ernest H. Stewart.
INVENTOR
George Eastman,
BY R. L. Stinchfield
N. M. Barnes
ATTORNEYS.

Patented Jan. 2, 1923.

1,441,146

UNITED STATES PATENT OFFICE.

GEORGE EASTMAN, OF ROCHESTER, NEW YORK, ASSIGNOR TO EASTMAN KODAK COMPANY, OF ROCHESTER, NEW YORK, A CORPORATION OF NEW YORK.

ROLL-FILM CARTRIDGE.

Application filed September 23, 1921. Serial No. 502,772.

*To all whom it may concern:*

Be it known that I, GEORGE EASTMAN, a citizen of the United States of America, residing at Rochester, in the county of Monroe and State of New York, have invented certain new and useful Improvements in Roll-Film Cartridges, of which the following is a full, clear, and exact specification.

This invention relates to a photographic roll film cartridge comprising a spool with a core and end flanges upon which is wound sensitized and protective strip material.

This invention has for its object to construct such a cartridge in which the strip material is accurately and certainly located, insuring the positive engagement of the end thereof in the core of the spool and the even winding of the strip, without particular care being exercised by the user. The strip material usually comprises a band of film and a protective backing or lead strip, the end of which forms the outer convolutions of the cartridge. It has been customary to bend back a small portion of the extreme tapered end of this backing or lead strip to provide a reinforcement, permitting the easy breaking of the seal wrapped around the package. This folding or bending back is usually done by hand by the operator at the time that the cartridge is rolled, and the line of bending is not predetermined and is frequently not perpendicular to the length of the protective strip.

I have discovered that if the line of bending is located with reasonable accuracy at such a point in the tapered end that its length is the same as the length of the slot in the core of the spool, the desired objects will be attained.

Reference will now be made to the appended drawings in which is described one embodiment of my invention, in which the above and other ends and advantages are attained. The same reference characters are used to denote the same parts in the several figures.

Fig. 1 is a perspective view of a spool with the strip material, except for a small portion of the end, wound thereon;

Fig. 2 is a longitudinal section of a spool with the end of the lead strip in position;

Fig. 3 is a perspective view of a spool with a fragmentary portion of a lead strip in position ready for winding thereon;

Fig. 4 is a cross section of a spool with a piece of strip material partially wound thereon.

The usual film spool 1 is shown having a core 2 and end flanges 3 rigidly attached to the ends thereof. In the embodiment shown, the core 2 is of wood and has a longitudinal slot 4 extending therethrough, the side walls of which are beveled, as indicated at 5, so that one opening 6 of the slot is longer than the other 7. The protective backing paper or lead strip 8 has its end tapered, the inclined edges 9 thereof being at the same angle to the longitudinal edges 10 of the strip as the beveled edges 5 of the slot bear to a plane perpendicular to the spool core. It is understood that a band of film, the lead end 14 of which is shown in Fig. 4 attached to the protective strip by the usual sticker band 15. The strips of protective material 8 are cut ready for spooling in a machine especially designed for that purpose, and I find that it is most convenient, at the time the strip 8 with its tapered end is cut, to make a weakened or scored line 11 therein at such a distance from the extreme end of the strip that the length of the line 11, which is perpendicular to the edges 10, is of substantially the same length as the long opening 6 of the spool 1 for which the strip material is designed.

In use, the operator attending to the spooling of the material winds it on, or causes it to be wound upon, the spool until only a small portion of the strip is left unwound. The operator then bends back the extreme end portion 12 beyond the weakened line 11 to the position shown in dotted lines in Fig. 1, and the winding is then completed and the package sealed. It is, of course, not essential to my invention that the making of the weakened line 11 be done in connection with the cutting. It may be done at the same time as the spooling by bending alone, without previous scoring, if this is performed on a correctly placed gauge or straight-edge.

When the film is to be used in a camera, the end of the lead strip material is unfolded and drawn from the spool containing it to another similar spool, this operation being well understood. The tapered end of the strip is thrust into the larger opening of the slot of the empty spool in the manner shown in Fig. 3, the tapered end fitting the beveled sides of the slot and the accurately positioned transverse line of bending coming at the edge of this opening when the end of the strip is properly seated. The tapering walls of the slot and the accurately placed line together insure the proper positioning of the strip, so that it will be guided and wound squarely and correctly into position on the spool, the extreme end 13 protruding beyond the small end of the slot being bent back in winding in the manner indicated in Fig. 4. Hitherto, when the bending of the strip end was done at random, the point of folding came so close to the extreme end that when the end was thrust through the slot the weakened line could not serve to position the strip in the manner herein described, but the body of the strip tended to round up from the core and not to lie snugly against it. Accordingly, if the end was merely thrust into the slot and the spool turned without precaution, it would frequently happen that the end would be drawn from the slot. When, however, the pre-formed bend comes at the right position, as in my improved band, the edge of the slot will catch it and even against considerable tension will draw the band firmly upon the spool.

It is to be understood that this invention is applicable to wound sensitized material differing widely from the particular form herein described; and I contemplate the use of all such modification and equivalents as fall within the scope of the appended claims.

Having thus described my invention, what I claim as new and desire to secure by Letters Patent is:

1. In combination, a spool with a core and a film strip with a lead portion adapted to be wound on said spool, there being a slot in the core longitudinally thereof, the end of the lead portion being tapered and having a transverse weakened line therein at that point thereof which has a width equal to the length of said slot.

2. In combination, a spool with a core and a strip of sensitized material with a lead portion adapted to be wound on said spool, there being a slot in the core longitudinally thereof, the end of the lead portion being tapered and folded on a line transversely of itself, the width thereof at the line of folding being equal to the length of the slot.

3. As an article of manufacture, a roll film cartridge comprising a spool with a core, a strip of sensitized material wound on said spool, and a protective lead strip wound around said material, there being in the core a slot longitudinally thereof, the end of the lead strip being tapered and folded on a line transversely of itself, the width thereof at the line of folding being equal to the length of the slot.

4. As an article of manufacture, a roll film cartridge comprising a spool with a core, a strip of sensitized material wound thereon, and a protective lead strip wound around said material, there being a slot in the core longitudinally thereof, the end of the lead strip being tapered and having a transverse weakened line therein at that point thereof which has a width equal to the length of said slot.

5. In combination, a spool with a core and a film strip with a lead portion adapted to be wound on said spool, there being longitudinally of the core a slot through the core with beveled walls, the end of the lead portion being tapered with the edges inclined at the same angle as the walls of the slot, and said lead portion having a transverse weakened line therein at that point which has a width equal to the length of the longer opening of said slot.

6. As an article of manufacture, a roll film cartridge comprising a spool with a core, a strip of sensitized material wound thereon, and a protective lead strip wound around said material, there being longitudinally of the core a slot with beveled walls extending therethrough, the end of the lead strip being tapered with edges inclined at the same angle as the walls of the slot, and said lead portion being folded on a line transversely thereof, the width thereof at the line of folding being equal to the length of the longer opening of said slot.

Signed at Rochester, New York, this 17th day of September, 1921.

GEORGE EASTMAN.